June 26, 1951 J. L. HURAULT 2,558,439

PILOT SIGNAL SYSTEM OF COMMUNICATION

Filed Dec. 2, 1946

3 Sheets-Sheet 1

INVENTOR
JEAN LOUIS HURAULT
By Adams & Bush
ATTORNEYS

PILOT SIGNAL SYSTEM OF COMMUNICATION

Filed Dec. 2, 1946 3 Sheets-Sheet 2

INVENTOR
JEAN LOUIS HURAULT
BY Adams & Bush
ATTORNEYS

June 26, 1951 J. L. HURAULT 2,558,439

PILOT SIGNAL SYSTEM OF COMMUNICATION

Filed Dec. 2, 1946 3 Sheets-Sheet 3

INVENTOR
JEAN LOUIS HURAULT
BY Adams & Bush
ATTORNEYS

Patented June 26, 1951

2,558,439

UNITED STATES PATENT OFFICE 2,558,439

PILOT SIGNAL SYSTEM OF COMMUNICATION

Jean Louis Hurault, Paris, France, assignor to Compagnie Generale d'Electricite, Paris, France, a French corporation Application December 2, 1946, Serial No. 713,405
In France June 9, 1945

Section 1, Public Law 690, August 8, 1946
Patent expires June 9, 1965

5 Claims. (Cl. 179—15)

The present invention relates to a multiplex carrier frequency communication system. To regulate the level of the signals delivered at the receiving station of a telecommunication system, such as a facsimile or television system, whether by wire or space channels, it is known to send at the same time as the communication signals properly so called, a pilot signal, constituted by an alternating current whose amplitude at the sending point is constant, the variations of amplitude of this pilot current upon arrival at the receiving station controlling a level regulating device.

The present invention has for an object to provide a device of this kind, applicable to the installation, having a plurality of channels, and in which the same one pilot current, broken up into trains of short pulses, is sent successively by time division in all the different channels.

The devices of the prior art for this purpose have had the disadvantage of at all times transmitting the pilot signal, whether useful communication signals are being transmitted or not, involving a considerable loss of transmitted power and loading the terminal equipment, which disadvantage is particularly marked in multiplex systems. This disadvantage is avoided in the arrangement of the present invention.

The device of the present invention is characterized by the fact that it comprises at the sending station, a rotary distributor connecting successively to each channel an alternating current source of pilot current of constant amplitude, and a chopper unit limiting the duration of transmission of this pilot current to a small fraction of the time interval during which the brush of the distributor is in contact with the contact stud corresponding to this channel so that very short impulses of pilot current are sent.

At the receiving station, the device of the present invention comprises on each channel an amplifier of variable gain, whose gain control circuit comprises a band pass filter set on the plot frequency, and a detector whose time constant is, during the application of a pulse of pilot signal, of the order of duration of this pilot signal, and in the absence of signal, is greater than the time interval which separates two successive pilot signals, so that the gain of this amplifier is controlled by the magnitude of the received pilot signal pulses. The pilot current thus loads the amplifiers only for a very short time.

The accompanying figures represent, as an example, several embodiments of the device according to the present invention.

Figure 1:
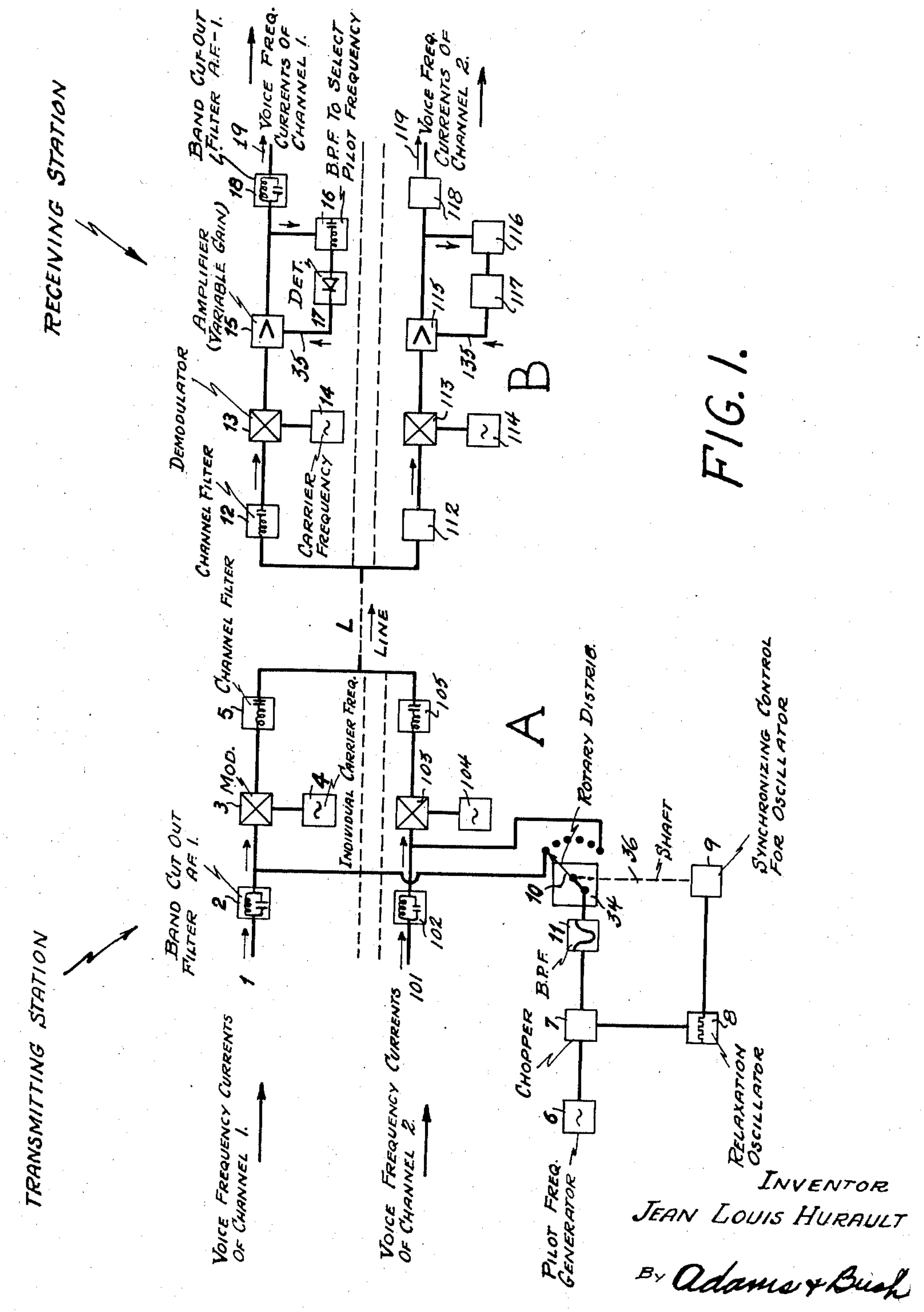
Fig. 1 is the arrangement of a system having one single stage of modulation.

According to the arrangement of Fig. 1, the pilot frequency is chosen in the band of the voice frequencies before they reach the modulator.

In the single modulation system of Fig. 1, A and B designate, respectively, the sending station and the receiving station which each comprise a certain number of channels, and are connected in the line L.

At the station A, at the transmitter, 1 designates the line of incoming voice currents of one of the channels, 2 designates a band filter preventing the mixing of the voice frequency currents and the pilot frequency current, 3 is the modulator, supplied by the source of carrier current 4, and 5 is a channel filter.

The pilot current, which is sent out by a generator 6, has a frequency which is in the region of the voice frequencies arriving on line 1. It is distributed successively in regularly spaced pulses to the different channels by a rotating distributor switch 10 at the transmitting station, driven continuously by a motor 34, and the contact studs of rotary switch 10 are connected to the different channels ahead of the modulators.

The pilot current is cut up into trains of pulses by the chopper unit 7, which may be an electromagnetic switch or relay controlled by the relaxation oscillator 8. The rotary distributor 10 preferably operates at a speed which corresponds to the rhythm of delivery of the pulses of the pilot current.

A band pass filter 11, interposed at the output of the chopper unit 7, has for its role to block surges which may be produced at the instant of current interruption by chopper 7.

At the receiving station B, for this single modulation system, of Fig. 1 each channel comprises a channel band pass filter 12, a demodulator 13 supplied by a source of carrier current 14, a variable gain amplifier 15 whose gain control circuit 35 is supplied by a circuit receiving energy from the output of amplifier 15 and comprising a band pass filter 16 set on the frequency of the pilot current, and a detector 17. The amplifier 15 comprises a variable mu tube to whose grid the gain control circuit is connected. This detector 17 is designed in such manner that, under the action of a pilot signal, its time constant shall be as small as possible and of the order of magnitude of the duration of this pilot signal, but, in the absence of a pilot signal shall be as great as possible, and in any case greater than the interval between two successive pilot signals. On a given channel, a band cut-out filter 18 set on the same frequency band as the filter 2 of the transmitting station, permits passage of the band of voice frequencies, which are delivered at output terminal 19, but cuts out pilot current frequency.

Figure 2:
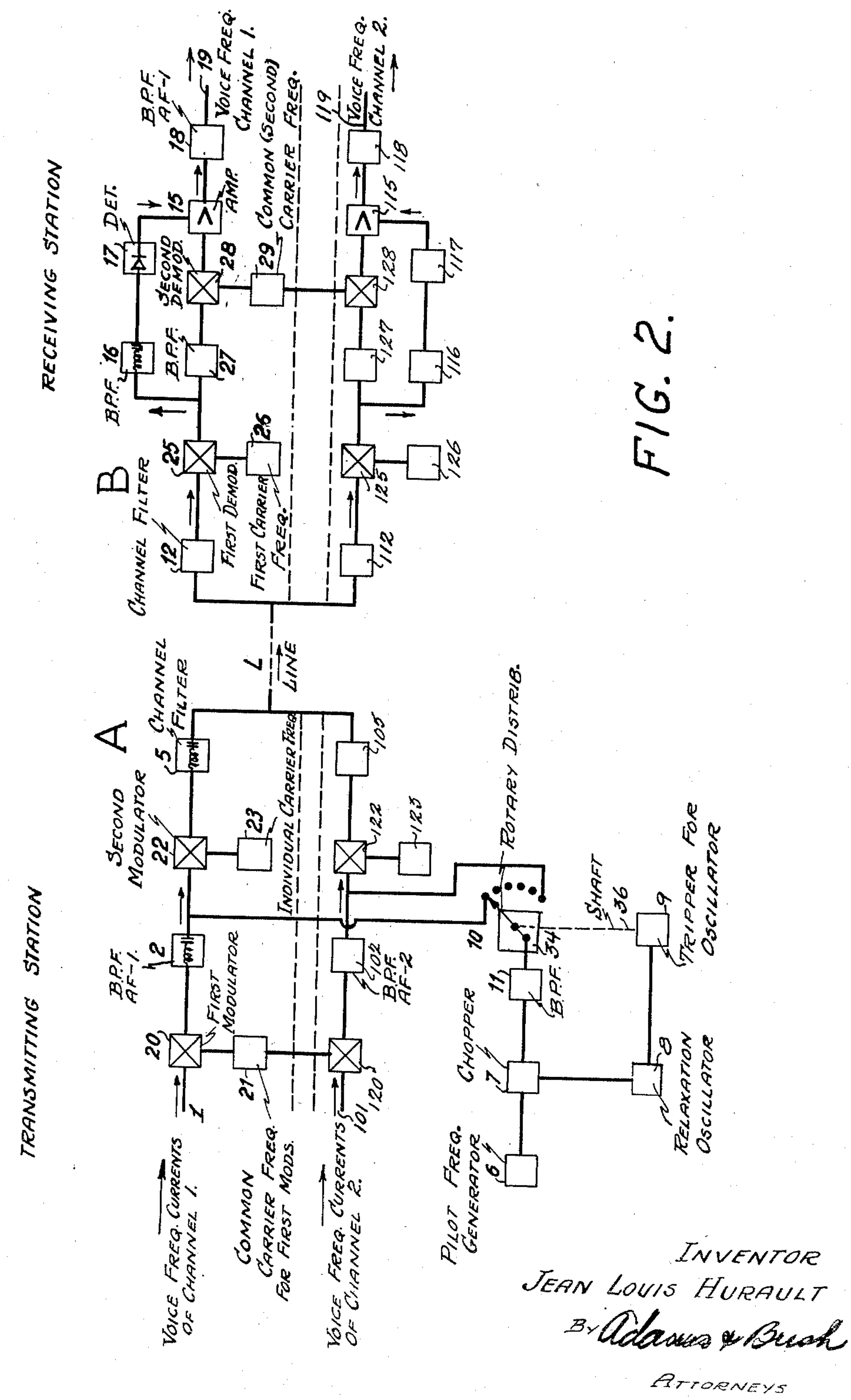
Fig. 2 is the arrangement of a double modulation system using two different stages of modulation.

Fig. 2 shows a similar system, but comprising two stages of modulation and has elements and connections which, in general, correspond to those of Fig. 1. At the transmitting station A, a first modulation is effected in first modulator 20 supplied by a carrier frequency current source 21 common to all of the channels, and a second modulation in a second modulator 22 supplied by a carrier frequency current source 23 individual to each channel. The pilot frequency is then chosen in the band of frequencies existing after the first modulation, and the pilot current is applied to the respective channels between their first modulator, as 20, and the second modulator, as 22. In this case, the pilot frequency can be advantageously chosen equal to the frequency of the carrier current of the first modulation, which is the same for all the channels.

At the receiving station B, 25 designates the first demodulator, supplied by the source first carrier frequency 26, and 27 is a band pass filter, and 28 is the second demodulator, supplied by a carrier frequency source 29 common to all the channels. At the output of first demodulator 25 there is taken off the pilot current supplying, through band filter 16 and detector 17, the control circuit for controlling the gain of amplifier 15.

Figure 3:
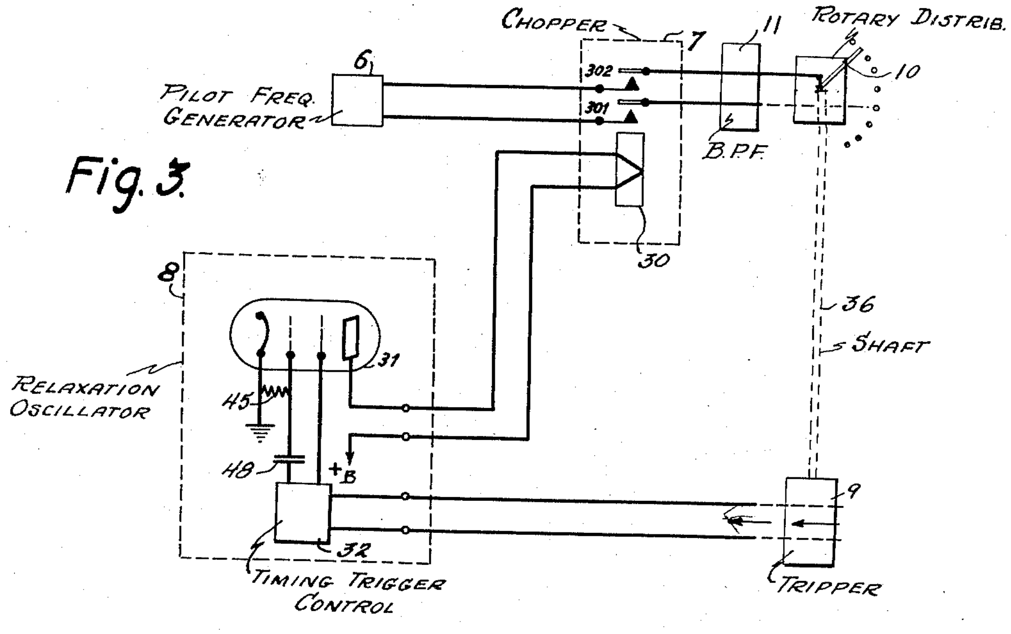
Fig. 3 shows a chopping mechanical device for forming pulses.

Fig. 3 shows a possible embodiment of the device 7 for chopping the pilot current from pilot frequency generator 6 into pulses. In this embodiment, the chopping takes place mechanically. In the output circuit of the pilot frequency source 6 there are inserted the contacts 301 and 302 of a relay or electromagnetic switch 30 supplied by the plate circuit of a tube 31 of relaxation oscillator 8.

Figure 4:
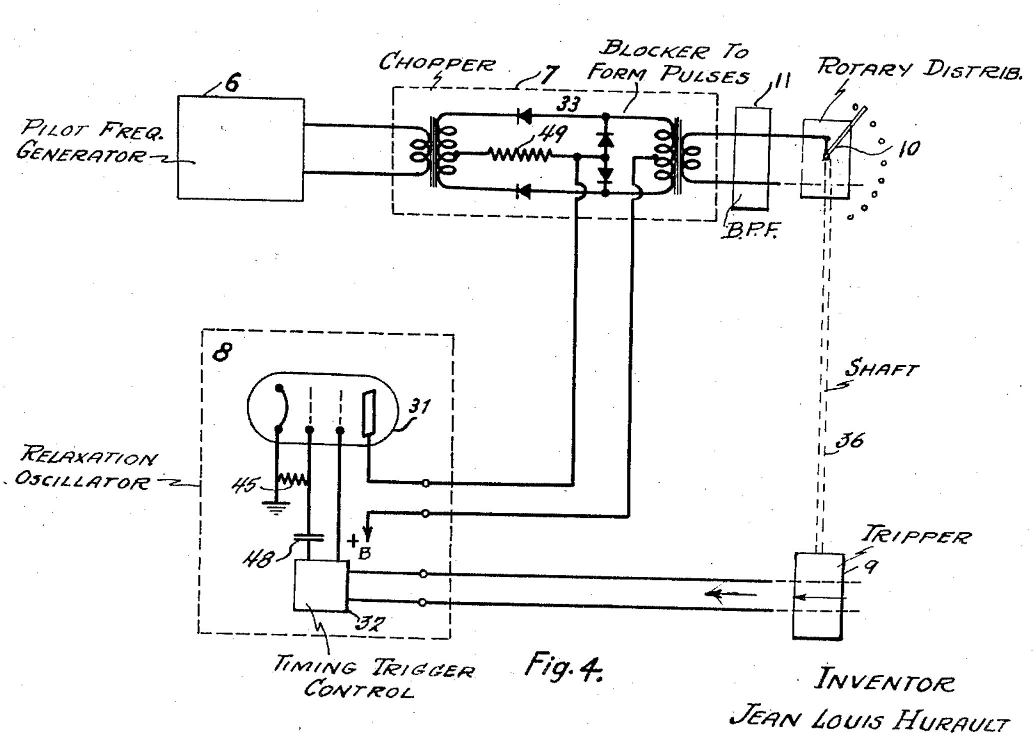
Fig. 4 shows an electrical device using a rectifier blocker for breaking the pilot current into pulses.

Fig. 4 shows another embodiment of the chopper device, employing only means with no moving mechanical elements, the contacts of the relay 30 of Fig. 3 are replaced by a rectifier blocker 33 whose control circuit is supplied by the plate current of relaxation oscillator tube 31, so that the blocker 33 permits the current from pilot current souce 6 to pass at each pulse produced by tube 31, these pulses being time controlled as before by the rotary distributor 10. The characteristics of the tube and of the rectifier blocker 33 are selected in such manner as to give to the currents in the output of the blocker 33 a rhythm and a duration respectively equal to the rhythm and the duration selected for the pilot signal current pulses.

In operation of the single stage modulation system of Fig. 1, the talking currents are applied at the transmitting station by incoming wires, as 1, to the filter band cut out, as 2, and to the modulator 3, which is supplied with the individual carrier frequency for the channel from source 4. The pilot frequency is supplied to a point on the connection between filter 2 and modulator 3, from pilot frequency source 6 and band-pass filter 11 and through chopper 7 and one contact of rotary switch 10. The rotary distributor 10 is started into operation. The modulated current, including the spaced pilot pulses, is transmitted over the line to the receiving station, where it is demodulated and the pilot signals, after separation, control the level of amplification.

In the two-stage modulation system of Fig. 2, the operation is generally similar to that for Fig. 1, but at the transmitter the pilot curent is applied just ahead of the second modulator and at the receiving station the pilot signals are separated out from the output of the first demodulator, and applied to the control terminal of the variable amplification amplifier.

It will be apparent to those skilled in the art that my invention is susceptible of modification to adapt the same to particular conditions and all such modifications which are within the scope of the appended claims, I consider to be comprehended within the spirit of my invention.

I claim:

1. In a carrier frequency multiplex transmission system, a transmitting station, a receiving station, said stations each having a plurality of channels, a transmission line connecting said transmitting station to said receiving station; in said transmitting station; a source of pilot frequency alternating current, a plurality of modulators on the respective channels of said system each having signal input terminals, a signal source connected to the signal input terminals of the first said modulator most remote from said line, a relaxation oscillator, pulse-forming chopping means having input terminals connected to the output of said source of pilot frequency current for chopping the same into successive pulses and having pulsing control terminals connected to said relaxation oscillator for controlling the pulse formation action of said means by said oscillator, and further having output terminals for delivering pulses of pilot frequency current, a rotary distributor having a rotary brush and having contact studs corresponding to the respective channels of said multiplex system, said brush being connected to said output terminals of said means, the respective studs of said distributor being connected to the signal input terminals of the last modulator of each channel nearest to said line; in the receiving station, on each channel signal receiving means, a first demodulator, a second demodulator, having its input connected to the output of said signal receiving means, a variable gain amplifier having signal input terminals and gain control terminals and output terminals, a first band pass filter connected between the output of said first demodulator and the input of said second demodulator, said signal input terminals of said amplifier being connected to the output of said second demodulator, and a derived control circuit also connected to the output of said first demodulator and comprising serially connected a second band pass filter having a pass band wherein is comprised the frequency of said pilot frequency source and further comprising a detector having its input serially connected to the output of said just mentioned band pass filter, and said detector having its output connected to the gain control terminals of said variable gain amplifier, said transmission line being connected between the output terminals of the last modulator of each channel and the input of each said signal receiving means.

2. A multiplex transmission system, according to claim 1, said pulse forming chopping means comprising a relay having an actuating winding and a fixed contact and a movable contact, said movable contact being connected to said source of pilot frequency current and said actuating winding being connected to said relaxation oscillator, and said fixed contact being connected to the brush of said rotary distributor.

3. A multiplex transmission system, according to claim 1, said pulse forming chopping means comprising a rectifier bridge blocker unit having input terminals, control terminals and output terminals, the input terminals of said blocker unit being connected to said source of pilot frequency current, the control terminals of said blocker unit being connected to said relaxation oscillator, and one of the output terminals of said blocker unit being connected to the brush of said rotary distributor.

4. A multiplex transmission system, according to claim 1, said detector having a time constant which under the action of an applied signal of said pilot frequency is of the order of duration of the duration of said pilot frequency signal, and in the absence of such signal is greater than the interval which separates two successive pilot signals on a given channel.

5. A multiplex transmission system, according to claim 1, and means for rotating said rotary distributor at a speed which corresponds to the rhythm of delivery of pulses of said pilot frequency current.

JEAN LOUIS HURAULT.

REFERENCES CITED

The following references are of record in the file of this patent:

UNITED STATES PATENTS

| Number | Name | Date |
|---|---|---|
| 1,498,568 | Osborne | June 24, 1924 |
| 2,039,404 | Green | May 5, 1936 |
| 2,293,750 | Leibe | Aug. 25, 1942 |
| 2,300,415 | Green | Nov. 3, 1942 |
| 2,365,472 | Jacobsen | Dec. 19, 1944 |
| 2,407,259 | Dickieson | Sept. 10, 1946 |
| 2,465,531 | Green | Mar. 29, 1949 |